US006973489B1

(12) United States Patent
Levy (10) Patent No.: US 6,973,489 B1
(45) Date of Patent: Dec. 6, 2005

(54) SERVER MONITORING VIRTUAL POINTS OF PRESENCE

(75) Inventor: Eli Levy, Herzelia (IL)

(73) Assignee: Mercury Interactive Corporation, Mountainview, CA (US)

(*) Notice: Subject to any disclaimer, the term of this patent is extended or adjusted under 35 U.S.C. 154(b) by 688 days.

(21) Appl. No.: 09/531,821

(22) Filed: Mar. 21, 2000

(51) Int. Cl.⁷ .................. G06F 15/173; G06F 15/16
(52) U.S. Cl. .................. 709/224; 709/202; 709/218; 709/219; 709/238
(58) Field of Search .................. 709/203, 218, 709/223, 224, 238

(56) References Cited

U.S. PATENT DOCUMENTS

| | | | |
|---|---|---|---|
| 5,544,310 A | 8/1996 | Forman et al. | |
| 5,742,754 A | 4/1998 | Tse | |
| 5,781,703 A | 7/1998 | Desai et al. | |
| 5,787,254 A | 7/1998 | Maddalozzo, Jr. et al. | |
| 5,812,780 A | 9/1998 | Chen et al. | |
| 5,819,033 A | 10/1998 | Caccavale | |
| 5,819,066 A | 10/1998 | Bromberg et al. | |
| 5,905,868 A | 5/1999 | Baghai et al. | |
| 5,918,004 A | 6/1999 | Anderson et al. | |
| 5,970,477 A * | 10/1999 | Roden | 709/218 |
| 6,006,260 A | 12/1999 | Barrick, Jr. et al. | |
| 6,138,157 A | 10/2000 | Welter et al. | |
| 6,157,618 A * | 12/2000 | Boss et al. | 709/224 |
| 6,205,413 B1 * | 3/2001 | Bisdikian et al. | 709/224 |
| 6,223,220 B1 * | 4/2001 | Blackwell et al. | 709/223 |
| 6,286,047 B1 * | 9/2001 | Ramanathan et al. | 709/224 |
| 6,324,492 B1 * | 11/2001 | Rowe | 709/203 |
| 6,370,571 B1 * | 4/2002 | Medin, Jr. | 709/218 |
| 6,405,252 B1 * | 6/2002 | Gupta et al. | 709/224 |
| 6,449,739 B1 * | 9/2002 | Landan | 709/224 |
| 6,480,898 B1 * | 11/2002 | Scott et al. | 709/238 |
| 6,484,143 B1 * | 11/2002 | Swildens et al. | 709/224 |

OTHER PUBLICATIONS

Randall, N., "Web Site Analysis Tools: The Results Are In," PC Magazine, Mar. 10, 1998, pp. 188-210.

(Continued)

Primary Examiner—Rupal Dharia
Assistant Examiner—Quang N. Nguyen
(74) Attorney, Agent, or Firm—Knobbe, Martens, Olson & Bear LLP (57) ABSTRACT

A server monitoring system monitors the performance of a web site or other Internet server system, as seen by users in multiple geographic access locations, without the need for special monitoring software or hardware within such locations. Automated agents that run at a central data center generate message traffic that is used to access and monitor the server system from the multiple remote locations. The message traffic associated with a particular remote access location is transmitted from the data center to the remote location across a dedicated link, such as an ATM link, and is routed onto the Internet at a corresponding Internet access point. The server response to each request message flows back to the data center across the same link as the corresponding request message. The remote access points thus serve as virtual points of presence for monitoring purposes. Server response times as seen from the remote access locations are determined by measuring the total response times as observed from the data center, and deducting from the total response times the round-trip latencies associated with the corresponding dedicated links. The response times and other performance data generated by the agents are aggregated within a database that is local to the agents. Multiple data centers may be interconnected such that each data center services a particular continent or other region using a respective set of virtual points of presence.

33 Claims, 4 Drawing Sheets

OTHER PUBLICATIONS

Dalton, G., "Online Measurement—Keynote's service lets companies see what customers see," Information Week Online, May 10, 1999 (2 pages printed from InformationWeek.com WEeb Site).

Killeelea, P., "Web Performance Measuring Tools and Services," Webreview.com, Jan. 15, 1999 (5 pages printed from Webreview.com web site).

Selected pages printed from Keynote.com Web Site on Aug. 27, 1999 (32 pages).

LoadRunner Controller User's Guide-Windows Version 5.01, Mercury Interactive Corporation (bound printout of online guide, 393 pages, undated).

"Mercury Interactive unveils hosted testing service," Xephon News, Online, dated Jan. 21, 2000, p. 1.

Amer, P. D., "A Measurement Center For The NBS Local Area Computer Network," IEEE Transactions on Computers, vol. C-31, No. 8, dated Aug. 1, 1982, p. 723-729.

International Search Report for PCT/US01/04461 (4-pages), Feb. 9, 2001.

* cited by examiner

SERVER MONITORING VIRTUAL POINTS OF PRESENCE

RELATED APPLICATIONS

This application relates generally to the subject matter described in the following co-pending U.S. patent applications, the disclosures of which are hereby incorporated herein by reference in their entirety: application Ser. No. 09/484,686, titled POST-DEPLOYMENT MONITORING OF SERVER PERFORMANCE, filed Jan. 17, 2000, now U.S. Pat. No. 6,449,739 and application Ser. No. 09/484,684, titled SERVICE FOR LOAD TESTING A TRANSACTIONAL SERVER OVER THE INTERNET, filed on Jan. 17, 2000, now U.S. Pat. No. 6,477,483.

FIELD OF THE INVENTION

The present invention relates to methods for monitoring the operation of a web site or other server system as experienced from multiple user locations on a computer network such as the Internet.

BACKGROUND OF THE INVENTION

The performance of a web site or other Internet server system, as experienced by end users of the system, can vary significantly depending on the geographic locations of the users. For example, users in London may experience much greater response times than users in San Francisco. Such variations in end user experience may occur, for example, as the result of Internet traffic conditions, malfunctioning Internet routers, or malfunctioning DNS (Domain Name Service) servers.

The ability to detect such location-dependent problems can be valuable to web site operators. For example, if users in a particular geographic region are known to frequently experience long response times, the web site operator can set up a mirror site within that region to service such users. The web site operator can also benefit from knowing whether a given problem is limited to specific geographic regions. For example, if it is known that a particular problem is seen by users in many different geographic locations, the web site operator can more easily identify the source of the problem as being local to the web site.

Some companies have addressed such needs of web site operators by setting up automated services for monitoring web sites from multiple geographic locations. These services are implemented using automated agents that run on computers at selected Internet connection points, or "points of presence." The points of presence (PoPs) are typically selected to correspond to major population centers, such as major cities throughout the world. The agents operate by periodically accessing the target web site from their respective locations as simulated users, and by monitoring response times and other performance parameters during such accesses. The agents report the resulting performance data over the Internet to a centralized location, where the data is typically aggregated within a database of the monitoring service provider and made available to the web site operator for viewing. The collected data may also be used to automatically alert the web site operator when significant performance problems occur.

SUMMARY OF THE INVENTION

A significant problem with the above approach is that the cost of setting up and maintaining agent computers in many different geographic regions is very high. For example, the monitoring service provider typically must pay for regional personnel who have been trained to set up and service the agent software and computers. The monitoring service provider may also incur costs for maintaining the security of the agent computers, and for upgrading the agent software as new versions become available.

Another problem with the existing approach is that problems with the Internet can inhibit or delay the reporting of performance data by the agent computers. As a result, the web site operator may not learn about a particular performance problem until well after the problem has been detected.

The present invention overcomes the above and other problems by setting up the automated agents (agent computers and software) in one or more centralized locations or "data centers" rather than deploying the agents at each of the desired PoPs. The message traffic (HTTP requests, etc.) generated by the centrally located agents is transmitted over special links to the desired Internet connection points (referred to as "virtual points or presence"), which are typically geographically remote from the agents. Upon reaching the virtual points of presence, the message traffic flows onto the Internet. The client requests appear to the servers to emanate from users that are local to the virtual PoPs. Because there is no need to deploy and maintain automated agents or other monitoring components at the virtual PoPs, the cost of setting up and maintaining the monitoring system is significantly reduced.

In a preferred embodiment, the links used to interconnect the centrally located agents to the remote virtual PoPs are preferably dedicated connection-oriented links, such as Asynchronous Transfer Mode (ATM) or CLEAR Line™ links, that provide a known or determinable latency. The remote side of each such link is preferably peered directly to the Internet (typically by a regional ISP). The centrally located agent(s) associated with a given virtual PoP is/are configured with the unique IP addresses of the virtual PoP, so that TCP/IP traffic between the agent(s) and the server system is forced through the virtual PoP to and from the Internet. To determine a server response time as seen from a virtual PoP location, an agent measures the overall response time as observed from the agent location (data center) and deducts the round-trip delay associated with the path between the agent and the virtual point of presence. The latency associated with this extra path may alternatively be ignored. The response times and any other performance data generated by the agents is preferably aggregated within a database that is local to the agents, reducing the likelihood of delays or omissions in reporting of observed performance data.

The invention may be used for "continuous" monitoring in which the server system is accessed on a periodic basis (e.g., once per hour) to detect problems as they arise, and may also be used for server load testing and other types of non-continuous performance monitoring. In addition, although the invention is particularly useful for monitoring Internet server systems such as web sites, the invention may also be used to test other types of server systems that are accessed from multiple geographic user locations.

BRIEF DESCRIPTION OF THE DRAWINGS

An example monitoring system which embodies the various inventive features will now be described with reference to the following drawings.

DETAILED DESCRIPTION OF THE PREFERRED EMBODIMENT

The following description sets forth numerous implementation-specific details of a system for monitoring the performance of a web site or other Internet server system. These details are provided in order to illustrate a preferred embodiment of the invention, and not to limit the scope of the invention. The scope of the invention is defined only by the appended claims.

Throughout the description, the term "monitoring" will be used to refer generally to both continuous monitoring (e.g., accessing the server system once per hour) and to short term testing (e.g., load testing of a deployed or pre-deployed server system). Example components and methods that can be used to load test a web site or other server system over the Internet are described in above-referenced application Ser. No. 09/484,684.

Figure 1:
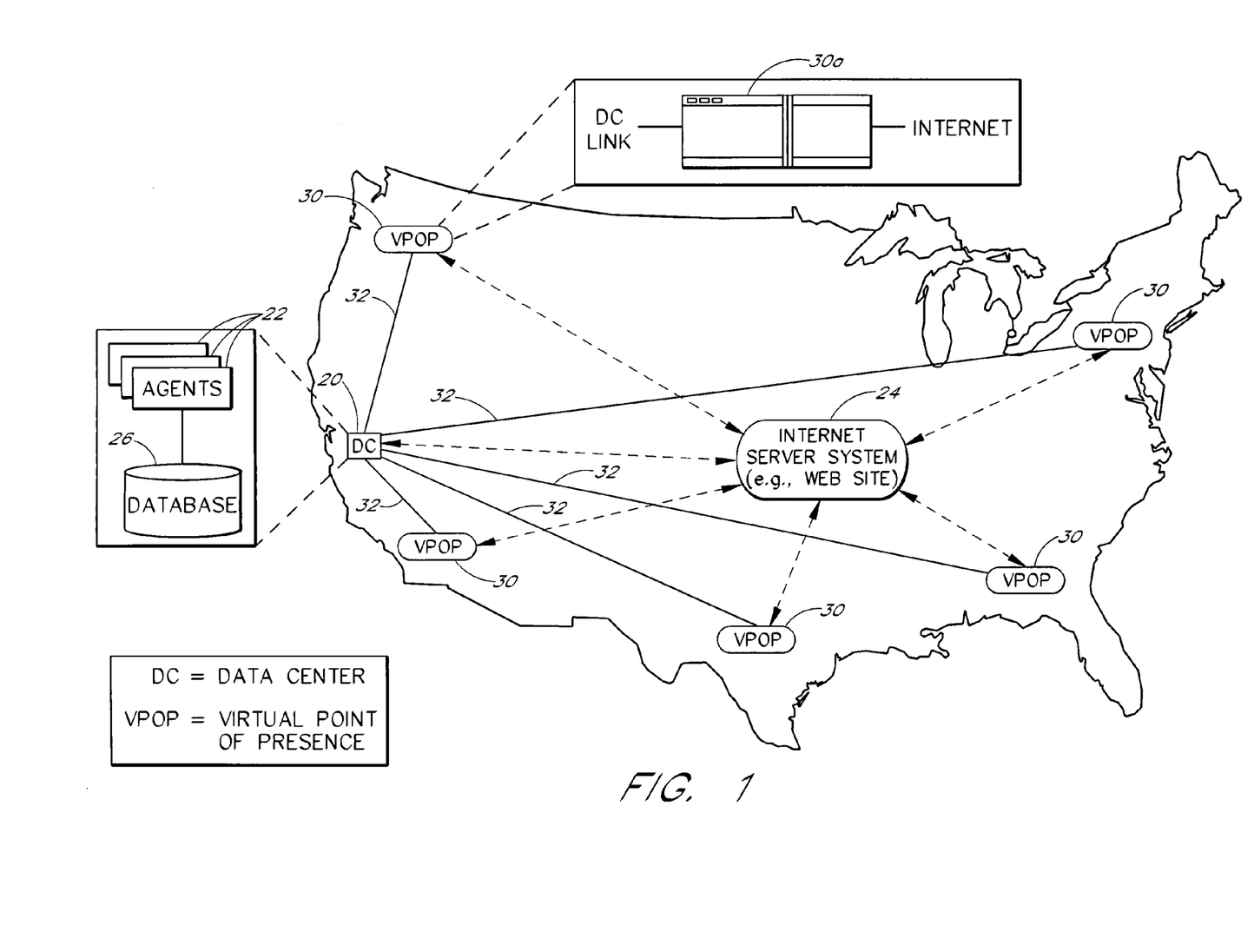
FIG. 1 illustrates the general architecture and theory of operation of the monitoring system.

FIG. 1 illustrates the general architecture of an example monitoring system according to the present invention. The monitoring system includes a data center 20 that hosts the automated agents 22 used to monitor an Internet server system 24, such as a web site. The agents 22 may be similar or identical to the agents used within existing monitoring services, such as the Topaz ActiveWatch™ service of Mercury Interactive Corporation. Each agent 22 may, for example, run on a respective general purpose computer (e.g., agent computers 40 in FIG. 3). The data center 20 also preferably hosts a database 26 that is used to store the performance data (transaction response times, failed transaction events, etc.) measured or otherwise generated by the agents 22.

The data center 20 is connected to multiple virtual PoPs 30 by respective communication links 32. The communications links 32 are preferably dedicated connection-oriented links for which the round-trip latency (transmission delay) between the data center and each virtual PoP is known, determinable, or negligible. Asynchronous Transfer Mode (ATM) and CLEAR Line links, which may be leased from a telecommunications company, are well suited for this purpose. Although separate links 32 are preferably used for each of the virtual PoPs, it is possible (although generally less cost effective) for two or more virtual PoPs to share a link to the data center.

Although a single Internet server system 24 is shown in FIG. 1, the monitoring system may be used to concurrently monitor many different web sites or other Internet server systems, including server systems set up on staging servers for pre-deployment testing. In addition, although only five virtual PoPs are shown, a given data center could support many tens or hundreds of remote virtual PoPs, including overseas virtual PoPs.

The virtual PoPs are connection points or gateways to the Internet, and replace some or all of the actual points of presence used in existing monitoring systems. As depicted in FIG. 1, each virtual PoP is preferably formed by peering the remote side of an ATM or other dedicated link 32 directly to the Internet at the remote location via an ISP's router 30a. The virtual PoPs may be established through contracts with regional ISPs (Internet Service Providers) or telecommunications companies. Each virtual PoP is an actual PoP for Internet access purposes, and thus has a unique set of IP addresses. By leasing a dedicated link to the PoP from a central location (data center) 20 and configuring the relevant agents 22 in the data center with the PoP's IP addresses, TCP/IP traffic is forced through the remote PoP to and from the Internet.

In contrast to actual points of presence used for web site monitoring, the virtual PoPs do not require any special monitoring or other application-specific hardware or software. Thus, the ISP or other provider of the access point need only be concerned with maintaining the contracted-for access to the Internet, and not with the underlying performance monitoring application for which the access point is being used. As a result, the cost of setting up and maintaining the monitoring system is relatively low in comparison to existing approaches. Further, because some or all of the agents reside in a centralized location, detected problems can be reported to the database 26 (and ultimately to the site operator) with improved timeliness and reliability.

Another option, which is not illustrated in the drawings, is to connect the remote side of a link 32 to a modem (wireless, digital or analog), and to use the modem to connect to the Internet (in addition to or instead of the direct connection). The agents can then be configured to control the modems so that the modems connect to local PoP's within their respective regions.

In operation, client requests (e.g., HTTP requests) used to access the Internet server system 24 are generated by a set of agents 22 at the data center 20, and are transmitted across the links to some or all of the virtual PoPs. At each such virtual PoP, the traffic is simply transmitted or inserted onto the Internet. The user request messages are thus pushed or forced onto the Internet at the desired locations 30 as the test is executed from the central location 20. The specific user actions performed by the agents, and the virtual PoPs through which such actions are performed, may be specified by the operator of the server system, and/or by the monitoring service provider, using well-known techniques. Typically, a given set of agents/agent computers will be assigned to a particular virtual PoP (as described below) and configured with the IP addresses of that PoP, and will thus handle all of the outgoing and incoming traffic associated with that remote location.

As depicted by the dashed lines in FIG. 1, each client request message and corresponding server response flows between a particular virtual PoP and the server system 24. Each client transaction appears to the server system as though it emanates from a user that is local to the virtual PoP. The server responses flow back to the data center 20 across the same links 32 as their corresponding client requests, and are used by the agents 22 to measure response times and possibly other performance parameters. To account for the added latency associated with hops between the data center and the relevant virtual PoP, the round-trip delay associated with this path, referred to herein as the "virtual PoP latency," is preferably subtracted from the total response times measured by the agents. As illustrated by the dashed line between the data center and the server system 24, the data center may act as an actual point of presence for monitoring purposes.

The performance data measured or otherwise generated by the agents 22 is preferably stored within the local database 26 in association with the monitoring session to which it corresponds. As is conventional, the performance data can be viewed by the operator of the server system using various online reports. For example, the operator may be able to view a report of the average and peak response times as seen from each of the access locations. The performance data may also be used to send real time alert notifications to the operator when predefined threshold conditions are satisfied.

Figure 2:
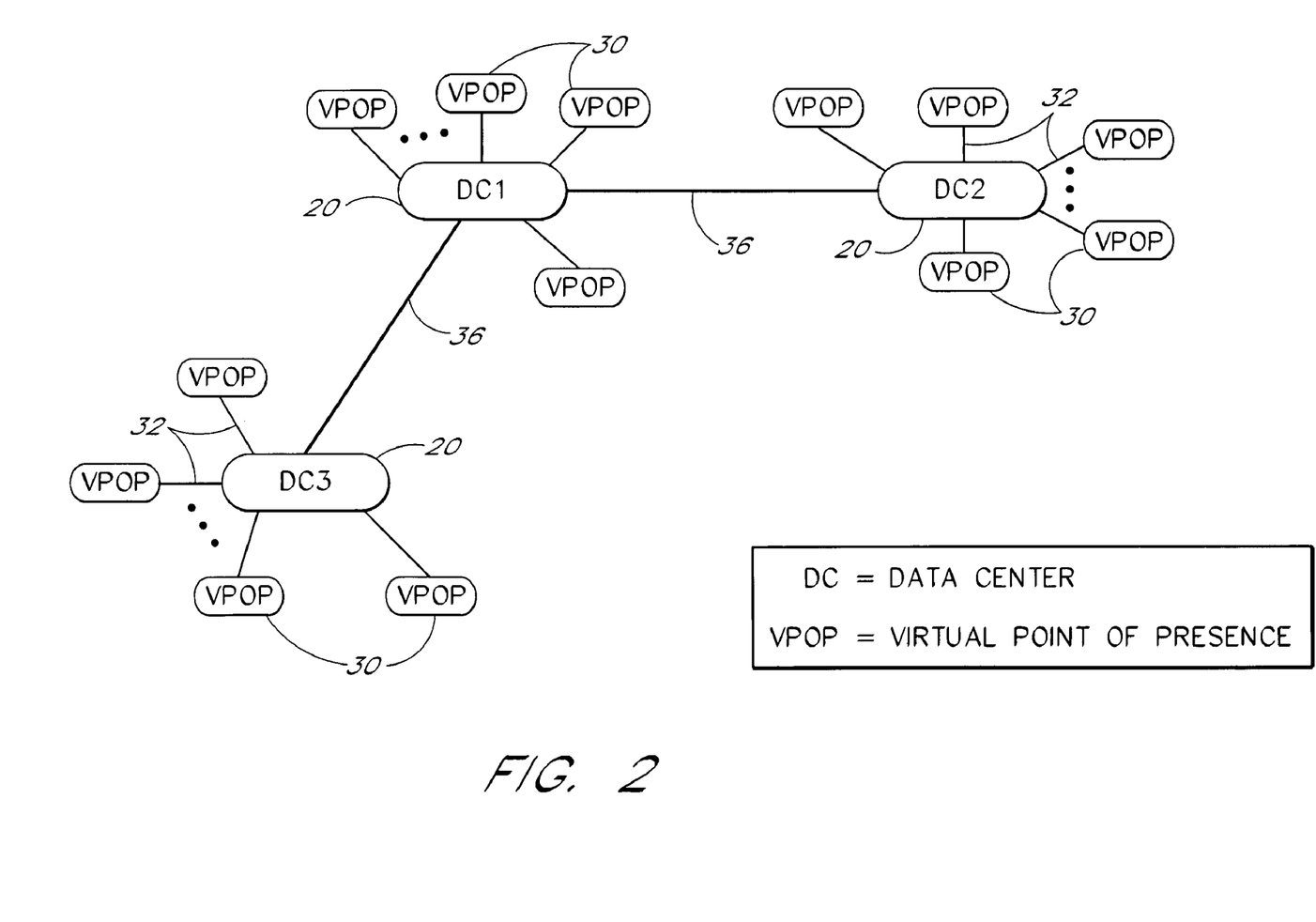
FIG. 2 illustrates the use of multiple data centers to provide coverage over a larger geographic area.

As illustrated by FIG. 2, the system of FIG. 1 can be scaled by adding additional "clusters" in which each cluster comprises a single data center 20 and multiple corresponding virtual PoPs 30 interconnected in a star configuration. Each such cluster may service a particular continent or other geographic region. For example, the DC1, DC2 and DC3 clusters shown in FIG. 2 may service North America, Europe and Australia, respectively. As illustrated, the data centers are interconnected in order to exchange control information and performance data as needed to implement multi-cluster monitoring sessions. The links 36 used for this purpose are preferably dedicated links, although other types of links or the Internet itself could be used. One of the data centers, such as DC1, may be designated as the primary or "master" data center for both control and data aggregation purposes, although different data centers could be designated as the master for different monitored server systems. An important benefit of using multiple clusters is that the number of relatively expensive overseas communications links needed to implement typical, multi-continent monitoring configurations is significantly reduced.

The basic method and architecture of the invention can also be used in combination with conventionally located agents that do not use virtual PoPs. For example, the system of FIG. 1 or 2 could be used in combination with additional agents that are set up by the web site operator on selected company computers, as described in above-referenced application Ser. No. 09/484,686. These additional agents would preferably report their respective performance data to the database 26 over the Internet, as in existing systems.

Figure 3:
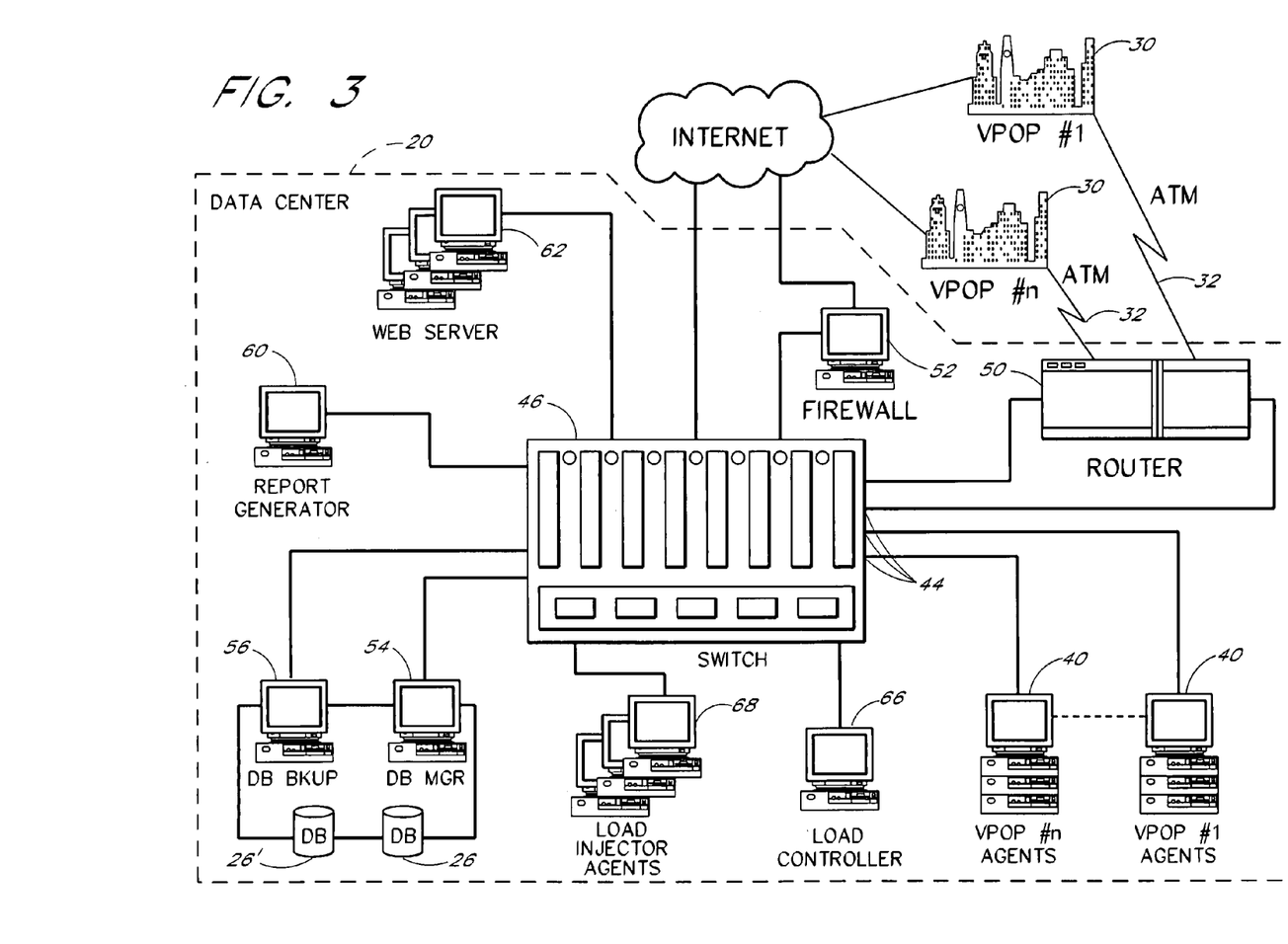
FIG. 3 illustrates an architecture that may be used to implement the data centers of the monitoring system.

FIG. 3 illustrates a preferred architecture for implementing the data centers 20. In the illustrated embodiment, one group of agent computers 40 is dedicated to each respective virtual PoP. Another group of agent computers (not shown) may be provided for monitoring server systems directly from the data center. Each agent computer runs agent software 22 (FIG. 1) that is capable simulating the actions of many hundreds or thousands of concurrent users while monitoring server responses. The agent software 22 (agents) may, for example, be implemented using the commercially-available LoadRunner® Virtual User (VUser) component of Mercury Interactive Corporation, which is capable of executing transactions generated using Mercury Interactive's LoadRunner®, WinRunner® and Astra QuickTest™ products. Other known programming methods for simulating user actions and monitoring server responses may be used; in addition, some or all of the agent functions could be implemented within separate software components or within application-specific hardware.

The agent computers 40 assigned to each given virtual PoP are grouped through a local hub (not shown) and connected to a respective port 44 of a switch 46, such as an Ethernet switch. The switch 46 is connected to a central router 50, such as a Cisco 7500 router, that has a sufficient number of ATM or other interfaces to connect directly to each of the virtual PoPs. The router 50 may also provide connectivity to other data centers. The switch is preferably connected to the Internet both directly and through a firewall 52, as shown. Another configuration option is to connect the agent groups 40 to the central switch 46 and use its VLAN capabilities to define each group's traffic flow to the corresponding remote location 30.

The data center 20 also preferably includes database management and backup systems 54, 56, a report generator component 60 and a web server 62, all of which are locally connected to the switch 46. The database management and backup systems are used to maintain the database 26, which stores information associated with the various monitoring sessions. The data associated with a given session may include, for example, the transactions (test scripts and associated data) to be executed by the agents, session configuration options, aggregated performance data, and information about the customer/operator. The report generator 60 produces session-specific reports based on the performance data stored within the database 26. The web server 62 provides access to the online reports, and may also provide functionality for allowing site operators to remotely set up monitoring sessions and alert notification conditions. The traffic to and from the web server is protected by the firewall 52.

As further illustrated by FIG. 3, the data center 20 may also include a group of agent computers 68 that are used to load test the server system 24 directly from the data center. As mentioned above, the server system 24 can also be load tested using the agent groups 40 and corresponding virtual PoPs. A load controller computer or console 66 may also be included for allowing a human operator to control the load applied by the agent computers 68, 40. The connections between the switch 46 and the various local components 40, 50, 52, 54, 56, 60, 62, 66, 68 may be made using 100-megabit and gigabit connections.

Transactions and transaction execution schedules may be assigned to the agent computers using well-known methods. The user interface described in the above-referenced application Ser. No. 09/484,686, now U.S. Pat. No. 6,449,739 may be used for this purpose. Each transaction specifies a sequence of user steps or actions (form submission requests, page requests, etc.) to be performed by an agent as a simulated user. For a web site of an online retailer, for example, a transaction may consist of a search for a particular item followed by a verification step which confirms a price range of the item. The transactions executed through each of the virtual PoPs may, but need not, be the same.

In operation, as the agents 22 execute their assigned transactions, the agent computers 40 associated with a particular virtual PoP generate TCP/IP packets and transmit the packets to that virtual PoP via the switch 44, router 50, and a corresponding link 32. The return traffic follows the same path in the reverse direction. As mentioned above, the agents 22 measure the server response times, adjust the measurements to account for virtual PoP latencies, and report the results to the local database 26. The agents may additionally or alternatively be configured to report the performance data to the database of a remote data center. If the server system 24 is to be load tested, the load produced by the agents may be ramped up over time by the load controller 66, such as by ramping up the number of active virtual users.

If ATM links are used, the TCP/IP packets are transmitted across the link 32 as ATM cells according to a particular quality of service level. If a CBR (constant bit rate) quality of service is used, the virtual PoP latency can be determined based on the current load on the link. A look up table of load values and corresponding delays can be generated for each ATM link 32 prior to use and then used for this purpose using well-known techniques. Depending upon the nature of the link 32 and the type of monitoring performed, it may be practical to simply ignore the virtual PoP latencies or to treat the latencies as constants.

Although ATM or other connection-oriented links 32 are preferably used for communications between the data center 20 and the virtual PoPs 30, the Internet could alternatively be used for such communications. One disadvantage to using the Internet for this purpose is that the TCP/IP protocol currently does not provide a mechanism for ensuring that the return traffic flows through the virtual PoP node. As a result, the response times seen at the virtual PoPs may be more difficult to accurately measure. As services and technologies become available that allow the return route over the Internet to be fully controlled, it may become more desirable to use the Internet instead of dedicated links 32.

Figure 4:
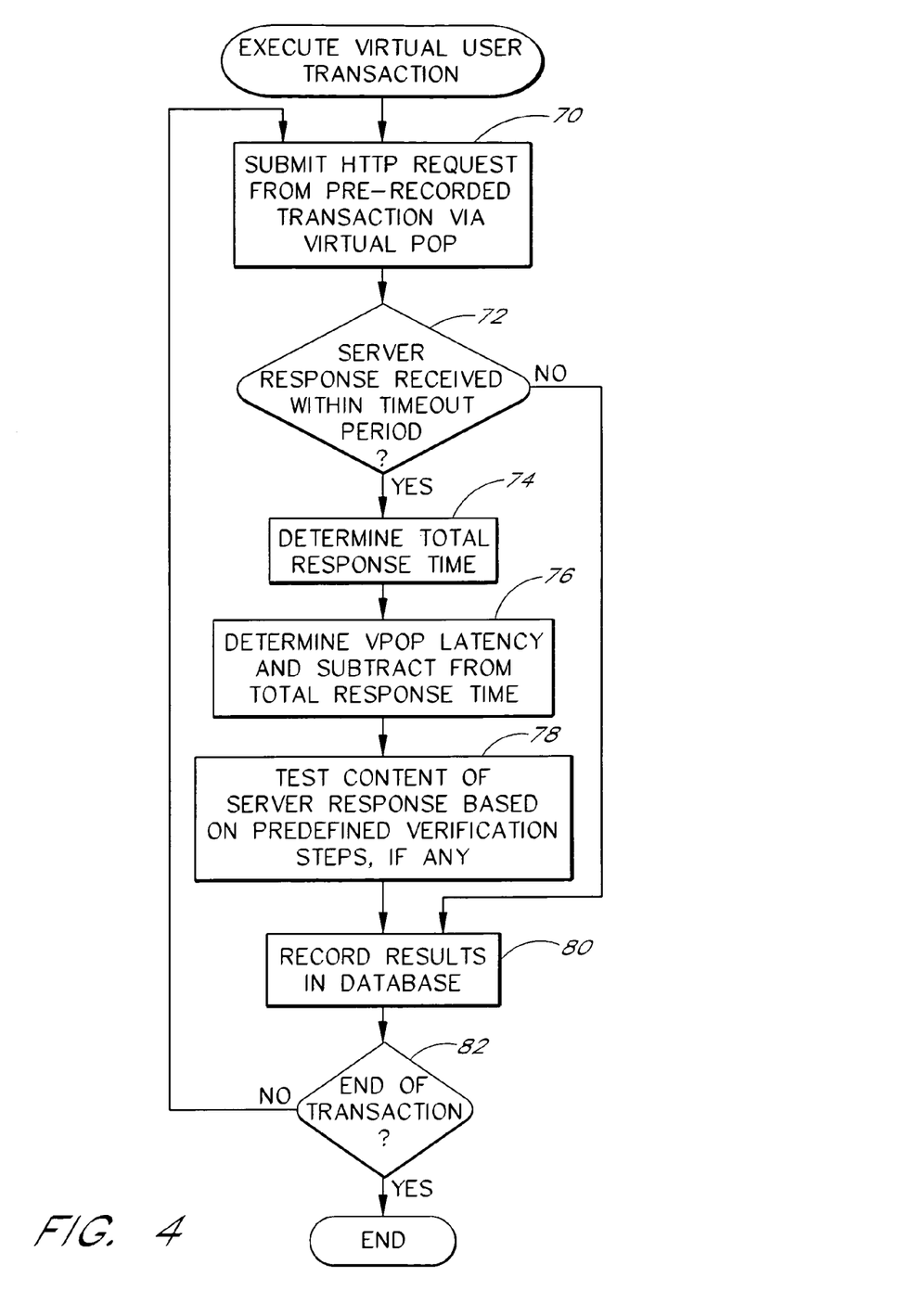
FIG. 4 illustrates a basic program loop used by the agents.

FIG. 4 illustrates the basic program loop that may be executed by each agent computer 40 to monitor a web site. In each iteration of the program loop, the agent generates an HTTP request that is addressed to the web site, and transmits the request to the Internet via the agent's virtual PoP (block 70). The HTTP request may be generated, for example, by reading a line from a prerecorded or otherwise predefined test script. If no response is received within a timeout interval (block 72), the agent records the timeout event in the database (block 80). If, on the other hand, the agent receives a server response, the agent determines the amount of time that lapsed between the transmission of the request and receipt of the response (block 74). The agent then preferably subtracts from this total response time value the virtual PoP latency (block 76), which may be determined as described above or treated as a constant. Any processing method which has the effect of subtracting out or deducting the virtual PoP latency may be used for this purpose. In addition, the task of subtracting the virtual PoP latency could be performed at a later time, such as when the user views the data, and/or by a separate component. As depicted by block 78, the agent may additionally or alternatively determine whether the server response includes one or more expected values, text strings, or other elements. The performance data (adjusted response tines, results of verification steps, etc.) are recorded within the database 26 in association with the monitoring session, virtual PoP location, a time stamp, and possibly other data. The process is repeated until execution of the transaction is complete or deemed a failure.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow.

What is claimed is:

1. A method of monitoring access to a server system as experienced from multiple user locations on a computer network, comprising:

at a monitoring location, generating first and second request messages that represent requests from users of the server system;

transmitting the first request message over a first communications link from the monitoring location to a first network access location that is remote from the monitoring location for transmission on the network at the first network access location, to thereby simulate access to the server system by a user who is local to the first network access location;

transmitting the second request message over a second communications link from the monitoring location to a second network access location that is remote from both the monitoring location and the first network access location for transmission on the network at the second network access location, to thereby simulate access to the server system by a user who is local to the second network access location; and at the monitoring location, monitoring responses received from the server system to the first and second request messages;

whereby user access to the server system as experienced by users local to the first and second network access locations is monitored without the need for monitoring components local to the first and second network access locations.

2. The method as in claim 1, wherein monitoring responses received from the server system comprises:

determining a total response time to the first request message as observed at the monitoring location; and subtracting from the total response time a delay associated with the first communications link, to thereby determine a response time as experienced at the first network access point.

3. The method as in claim 2, further comprising estimating the delay based at least on a load applied to the first communications link.

4. The method as in claim 2, wherein the network is the Internet, and the first and second communications links are connection-oriented links that directly connect the monitoring location to the first and second network access locations, respectively.

5. The method as in claim 4, wherein the first and second communications links are Asynchronous Transfer Mode links.

6. The method as in claim 4, wherein the server system comprises a web server of a publicly accessible web site.

7. The method as in claim 1, wherein the first and second communications links are connection-oriented links that directly interconnect the data center with the first and second network access locations, respectively.

8. The method as in claim 7, wherein the first and second communications links are Asynchronous Transfer Mode links.

9. The method as in claim 8, wherein the network is the Internet.

10. The method as in claim 1, wherein transmitting the first request message over a first communications link comprises transferring the first request message over the first communications link to a router that is directly connected to the network.

11. The method as in claim 1, wherein transmitting the first request message over a first communications link comprises transferring the first request message over the first communications link to a modem that is locally connected to the network.

12. A system for monitoring performance of a server system as seen from multiple user locations, including user locations that are geographically remote from one another, the system comprising:

a plurality of agent computers that are locally interconnected at a central location, the agent computers configured to generate request messages to the server system as simulated users and to monitor responses from the server system to the request messages; and a plurality of communications links, each communications link connecting one or more of the plurality of agent computers to a respective network access point within a respective user location that is geographically remote from the central location;

wherein the plurality of agent computers are configured to communicate with the server system via the plurality of communications links to monitor performance of the server system as seen from the multiple user locations;

whereby the system monitors the performance of the server system as seen from multiple user locations without the need for performance monitoring components local to said user locations.

13. The system as in claim 12, wherein each communications link is a dedicated, connection-oriented communications link.

14. The system as in claim 12, wherein at least some of the plurality of communications links are Asynchronous Transfer Mode links.

15. The system as in claim 12, wherein at least some of the plurality of communications links produce a round-trip latency that is predicable based on a current load on the communications link.

16. The system as in claim 12, wherein the server system is an Internet server system, and at least some of the communications links are directly peered to the Internet within respective user locations.

17. The system as in claim 12, wherein the plurality of agent computers are arranged into groups, wherein each group is assigned to a respective communications link and corresponding user location.

18. The system as in claim 17, wherein the agent computers within a group are configured to use unique IP (Internet Protocol) addresses associated with a corresponding remote Internet point of presence.

19. The system as in claim 17, wherein at least one of the groups comprises multiple agent computers that are grouped through a hub and a single port of a local switch.

20. The system as in claim 19, wherein the switch in connected to a router that is directly connected to the plurality of communications links.

21. The system as in claim 12, wherein the agent computers are configured to measure response times as seen from the user locations by measuring total response times to request messages, and by deducting round-trip latencies associated with the communications links.

22. The system as in claim 12, further comprising a database that locally stores server performance data generated by the plurality of agent computers.

23. A method for monitoring access to a server system as experienced from a network access location, comprising:

at a first location which is remote from the network access location, generating a user request message that is addressed to the server system;

sending the request message over a communications link to the network access location for transmission over a computer network from the network access location to the server system, to thereby simulate access to the server system by a user who is local to the network access location;

at the first location, receiving a response to the request message from the server system over the communications link; and determining a response time to the user request message as experienced at the network access location;

whereby the performance of the server system as experienced from the network access location is measured without a need for any performance monitoring components at the network access location.

24. The method as in claim 23, wherein determining the response time as experienced at the network access location comprises determining a total response time observed at the first location, and subtracting from the total response time a round-trip delay attributable to the communications link.

25. The method as in claim 24, further comprising estimating the round-trip delay based at least upon a load applied to the communications link.

26. The method as in claim 23, wherein the computer network is the Internet, and the communications link is a connection-oriented link that directly connects the first location to the network access location.

27. The method as in claim 26, wherein the communications link is an Asynchronous Transfer Mode link.

28. The method as in claim 23, wherein the server system comprises a web server of a publicly accessible web site.

29. The method as in claim 23, further comprising recording the response time, and response times measured for other user locations, within a database that is local to the first location.

30. A system for monitoring a web site from multiple geographic locations, the system comprising:

a data center comprising at least one computer system programmed to access and monitor the web site; and a plurality of Internet connection points, each of which is located at a different respective one of said multiple geographic locations, at least some of the Internet connection points being geographically remote from others and from the data center;

wherein the data center sends request messages to the web site, and receives response messages from the web site, through the plurality of Internet connection points to monitor the web site as seen by users in each of the multiple geographic locations.

31. The system as in claim 30, wherein the data center is connected to the plurality of Internet connection points by dedicated communications links.

32. The system as in claim 30, wherein the data center monitors the web site as seen by users in the multiple geographic locations without the use of any monitoring components in any of the multiple geographic locations.

33. The system as in claim 30, wherein the data center calculates response times of the web site as seen from each of the Internet connection points.

* * * * *

UNITED STATES PATENT AND TRADEMARK OFFICE
CERTIFICATE OF CORRECTION

PATENT NO. : 6,973,489 B1
APPLICATION NO. : 09/531821
DATED : December 6, 2005
INVENTOR(S) : Levy It is certified that error appears in the above-identified patent and that said Letters Patent is hereby corrected as shown below:

On the title page item [54] and col. 1, line 1, after "SERVER MONITORING" insert --USING--.

On the title page item [56], column 1, under "Other Publications," line 4, delete "WEeb" and insert --Web--.

At column 7, line 43, delete "tines" and insert --times--.

Signed and Sealed this

Twelfth Day of December, 2006

JON W. DUDAS
*Director of the United States Patent and Trademark Office*